(12) United States Patent  
Langford et al.

(10) Patent No.: US 7,044,228 B2
(45) Date of Patent: May 16, 2006

(54) FLOWLINE JUMPER FOR SUBSEA WELL

(75) Inventors: Gawain Langford, Houston, TX (US);
Francisco Dezen, Houston, TX (US);
Lars-Petter Sollie, Houston, TX (US);
Stephen P. Fenton, Houston, TX (US)

(73) Assignee: Vetco Gray Inc., Houston, TX (US)

( * ) Notice: Subject to any disclaimer, the term of this patent is extended or adjusted under 35 U.S.C. 154(b) by 276 days.

(21) Appl. No.: 10/358,731

(22) Filed: Feb. 5, 2003

(65) Prior Publication Data

US 2003/0145998 A1     Aug. 7, 2003

Related U.S. Application Data

(63) Continuation-in-part of application No. 10/340,094, filed on Jan. 10, 2003, now Pat. No. 6,742,594.

(60) Provisional application No. 60/354,612, filed on Feb. 6, 2002, provisional application No. 60/425,377, filed on Nov. 12, 2002.

(51) Int. Cl.
*E21B 29/12* (2006.01)
*F16L 1/28* (2006.01)

(52) U.S. Cl. ............... 166/350; 166/343; 405/158; 405/171

(58) Field of Classification Search ............ 166/347, 166/346, 344, 350, 366, 368, 343; 405/158, 405/162, 169, 170, 171
See application file for complete search history.

(56) References Cited

U.S. PATENT DOCUMENTS

| 3,204,708 | A | * | 9/1965 | Berne | 175/6 |
|---|---|---|---|---|---|
| 3,495,658 | A |   | 2/1970 | Johnson | |
| 3,524,325 | A |   | 8/1970 | Brown | |
| 3,592,263 | A | * | 7/1971 | Nelson | 166/356 |
| 3,678,996 | A | * | 7/1972 | Herd | 166/368 |
| 3,698,348 | A | * | 10/1972 | Morgan | 114/245 |
| 3,732,923 | A | * | 5/1973 | Fowler | 166/340 |
| 3,835,656 | A | * | 9/1974 | McDermott | 405/170 |
| 3,899,894 | A | * | 8/1975 | Liautaud | 405/170 |
| 4,051,687 | A | * | 10/1977 | Ells | 405/173 |
| 4,075,862 | A | * | 2/1978 | Ames | 405/169 |
| 4,135,844 | A | * | 1/1979 | Lamy | 405/171 |
| 4,175,620 | A | * | 11/1979 | Nolan et al. | 166/343 |
| 4,182,584 | A | * | 1/1980 | Panicker et al. | 405/224.3 |
| 4,183,697 | A | * | 1/1980 | Lamy | 405/170 |
| 4,263,004 | A | * | 4/1981 | Joubert et al. | 405/172 |
| 4,265,313 | A | * | 5/1981 | Arnaudeau | 166/366 |
| 4,277,202 | A | * | 7/1981 | Archambaud et al. | 405/169 |
| 4,378,848 | A | * | 4/1983 | Milberger | 166/351 |
| 4,400,110 | A | * | 8/1983 | Beynet et al. | 405/224.2 |
| 4,493,590 | A | * | 1/1985 | Ayers et al. | 405/170 |

(Continued)

FOREIGN PATENT DOCUMENTS

WO     WO03/031765 A1     4/2003

*Primary Examiner*—Thomas A Beach
(74) *Attorney, Agent, or Firm*—Bracewell & Giuliani LLP

(57) ABSTRACT

A subsea well system has a flowline jumper that extends between components on the sea floor. The jumper has connectors on each end for connecting to the two components and has a curved portion. At least a portion of the jumper is buoyant to cause it to assume a vertical arcuate configuration when installed. One end of the jumper has a connector that has a mandrel that guides into a mating socket formed on the end of an arm. The arm is mounted to a ring that can be rotated to various orientations.

20 Claims, 6 Drawing Sheets

U.S. PATENT DOCUMENTS

| | | | | |
|---|---|---|---|---|
| 4,541,753 A | * | 9/1985 | Langner | 405/166 |
| 4,544,036 A | * | 10/1985 | Saliger | 166/341 |
| 4,671,702 A | * | 6/1987 | Langner | 405/169 |
| 4,820,083 A | * | 4/1989 | Hall | 405/169 |
| 4,832,124 A | * | 5/1989 | Rayson | 166/339 |
| 4,906,137 A | * | 3/1990 | Maloberti et al. | 405/224.3 |
| 5,190,107 A | * | 3/1993 | Langner et al. | 166/355 |
| 5,226,482 A | * | 7/1993 | Giannesini et al. | 166/353 |
| 5,275,510 A | * | 1/1994 | de Baan et al. | 405/171 |
| 5,320,175 A | * | 6/1994 | Ritter et al. | 166/339 |
| 5,341,884 A | * | 8/1994 | Silva | 166/347 |
| 5,593,249 A | * | 1/1997 | Cox et al. | 405/191 |
| 5,730,551 A | * | 3/1998 | Skeels et al. | 405/170 |
| 5,794,700 A | * | 8/1998 | Pollack | 166/339 |
| 5,807,027 A | * | 9/1998 | Ostergaard | 405/170 |
| 6,030,145 A | * | 2/2000 | Stewart et al. | 405/172 |
| 6,109,830 A | * | 8/2000 | de Baan | 405/170 |
| 6,146,052 A | * | 11/2000 | Jacobsen et al. | 405/169 |
| 6,182,761 B1 | * | 2/2001 | Bednar | 166/339 |
| 6,213,215 B1 | * | 4/2001 | Breivik et al. | 166/350 |

* cited by examiner

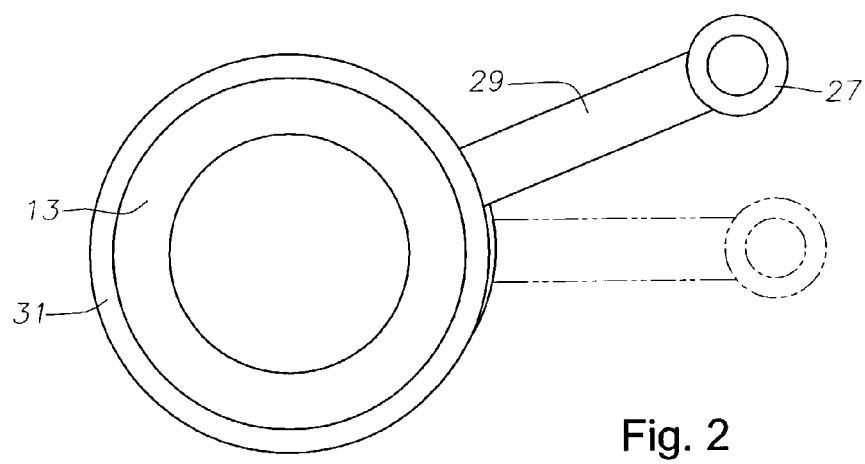
Fig. 2
Fig. 3
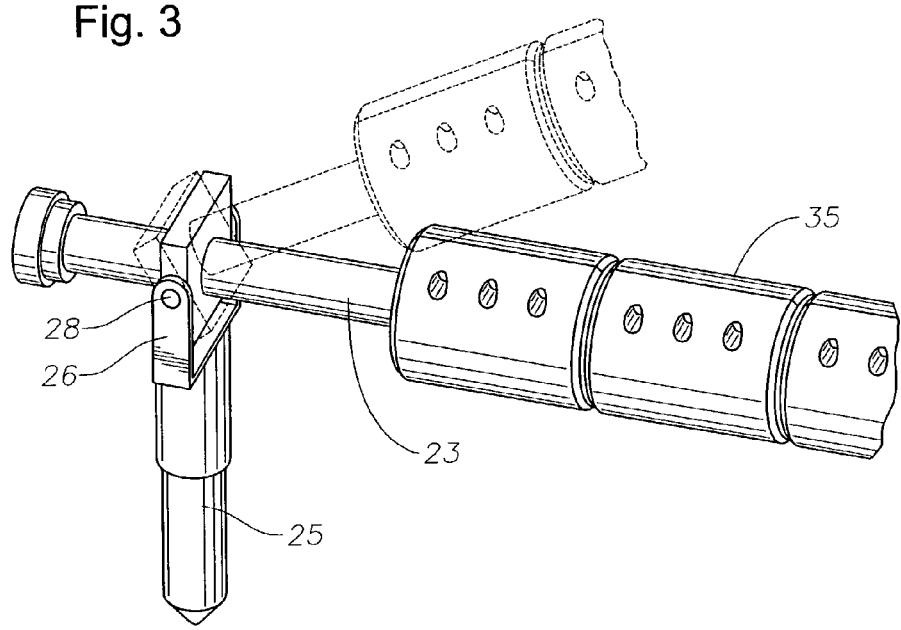

FLOWLINE JUMPER FOR SUBSEA WELL

This application is a continuation-in-part of application Ser. No. 10/340,094, filed Jan. 10, 2003, which issued as U.S. Pat. No. 6,742,594 on Jun. 1, 2004, and claims priority from the provisional application Ser. No. 60/354,612, filed Feb. 6, 2002, entitled "Flowline Jumper for Subsea Well" and provisional application Ser. No. 60/425,377, filed Nov. 12, 2002, entitled "Drilling and Producing Deep Water Subsea Wells".

FIELD OF THE INVENTION

This invention relates in general to subsea well systems, and particularly to a flowline jumper extending from a subsea well to another subsea component which may be in the form of a manifold, flowline or daisy chain to another well.

BACKGROUND OF THE INVENTION

One oil and gas production technique for offshore wells utilizes subsea Christmas trees. The tree locates on top of the wellhead housing and contains valves for controlling the production. The tree also normally will have a choke and may have various monitors and flow measuring devices. The tree has a production outlet that typically connects to another subsea component, such as a manifold, that may be some distance away, such as 50 meters to several kilometers. A flowline jumper connects the subsea tree to the other component.

The flowline jumpers between the various components on the sea floor are typically rigid steel pipes that are laid horizontally on the sea floor. Prior to installation of the jumpers, the distances between the components are measured or calculated. Then pipes are fabricated to the desired length and provided with couplings on the ends for connecting between two components.

If the measurements are not precisely made or the components moved from originally planned locations, new jumpers may need to be fabricated. The distance and the orientation between the various subsea components must be known in advance before the flowline jumpers can be fabricated because the lengths will be critical. Also, after installation, if one of the components needs to be retrieved or moved, it is a time-consuming task to disconnect the flowline jumper from the component.

SUMMARY OF THE INVENTION

In this invention, a flowline jumper is provided that has a curved portion, which creates flexibility for connecting between the two subsea components located on a sea floor. The flowline jumper has first and second connectors on opposite ends that are connected to the two components. At least a portion of the flowline jumper is buoyant and to cause the an apogee of the curved portion of the flowline to assume an elevation greater than the ends. The arcuate configuration reduces the need for the length of the flowline jumper to be precise. Also, the orientation may be changed more readily.

Preferably, at least one of the connectors on the flowline jumper is vertical so that it will stab vertically into a mating receptacle on one of the subsea components. Both of the connectors may be vertical. Alternately, one of the connectors may be horizontal. If so, this results in a portion of the flowline jumper being horizontally oriented and the other portion being arcuate.

In one embodiment, the flowline is sufficiently flexible so that the flowline is straight and linear while being lowered into the sea. The buoyancy is positioned to cause the flowline to bend into the curved configuration once connected.

In another embodiment, the curved portion is bent into shape prior to lowering the flowline into the sea. The buoyancy on the curved portion causes the flowline to locate in a vertical plane with the apogee of the curve elevated above the ends. Preferably, in the second embodiment, the pre-bent shape comprises the curved portion with two legs vertical and parallel to each other, each of the legs terminating in an end. A first leg stabs vertically into one of the subsea components. The flowline is lowered further, causing the end of the first leg to hinge over to a horizontal position and bending the first leg into a horizontal configuration. The second leg stabs vertically into the other subsea component as the first leg bends.

One of the subsea components is preferably a production tree mounted to a wellhead housing. In one embodiment, the wellhead housing has a ring that is mounted to its exterior, the ring being selectively rotatable relative to the wellhead housing. An arm extends from the ring, the arm having a vertical socket. With the assistance of a remote operated vehicle (ROV), the ring can be rotated to position the socket at various orientations. The flowline from the tree aligns with the arm. The flowline jumper has a connector with a mandrel that stabs into the socket to align the flowline connector with the tree coupling. Preferably, the connector and the mandrel are hinged, as mentioned above, for ease in installation.

BRIEF DESCRIPTION OF DRAWINGS

FIG. 2 is a schematic top view of a portion of the flowline coupling of the tree of FIG. 1.

FIG. 3 is an enlarged perspective view of one connector of the flowline jumper for connecting to the tree of FIG. 1.

DETAILED DESCRIPTION OF THE INVENTION

Figure 1:
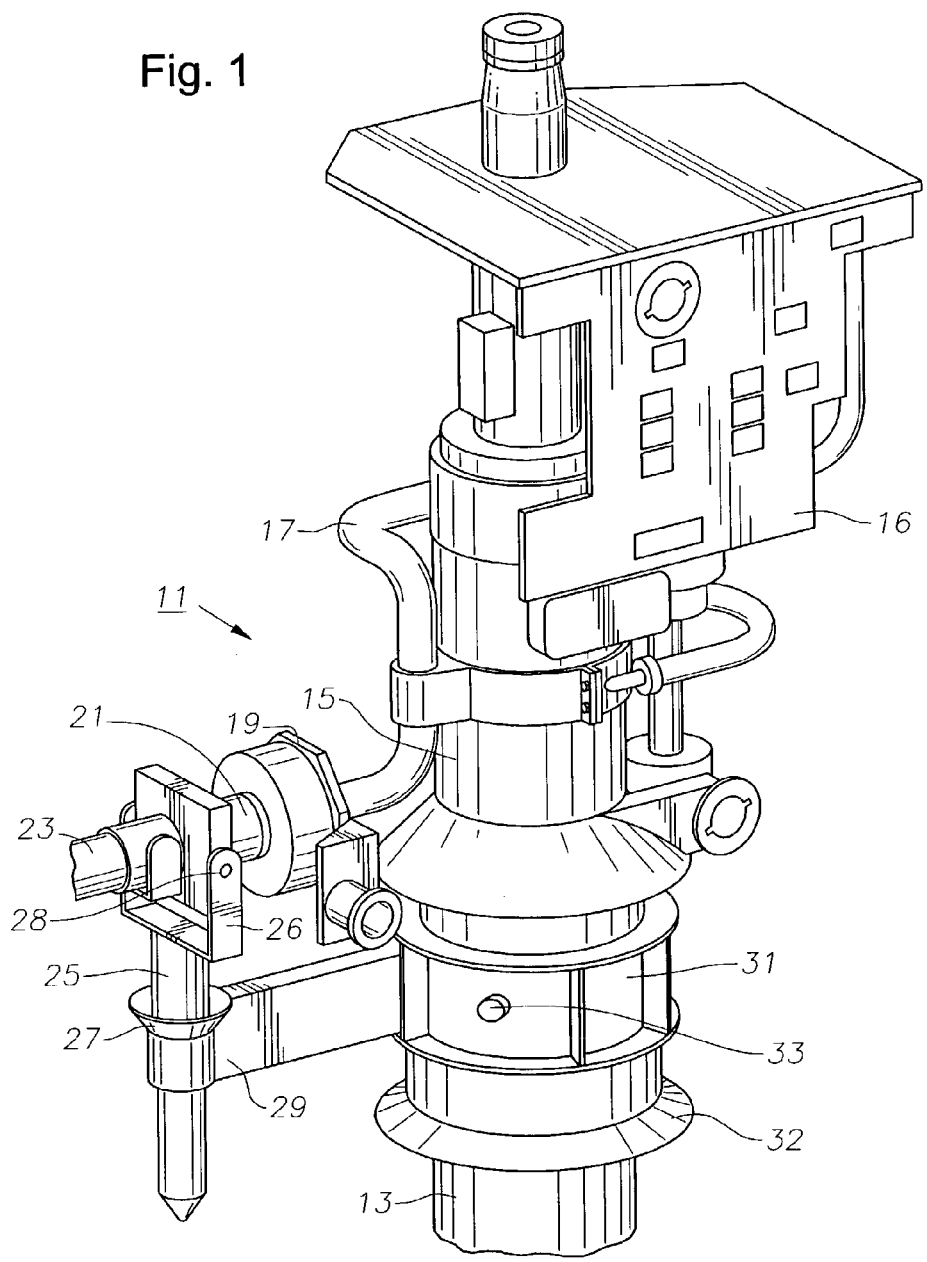
FIG. 1 is a perspective view of a tree and flowline coupling constructed in accordance with this invention.

The subsea well assembly 11 shown in FIG. 1 includes an outer wellhead housing 13 that is located at the upper end of the well at the sea floor. Outer wellhead housing 13 is a large diameter tubular member into which an inner or high pressure wellhead housing (not shown) lands. A tree 15 mounts on top of the inner wellhead housing. Tree 15 has a control assembly 16 mounted to it for controlling various valves (not shown) mounted to the tree. The valves control the flow of fluids within and from the tree. Tree 15 has a flow outlet 17 that is a tube that extends around a portion of the tree and terminates in a horizontally oriented coupling 19.

A flowline coupling 21 is shown aligned in position to mate with tree coupling 19. Couplings 19, 21 may be of variety of types including collet, clamp, flange or other types. Flowline coupling 21 is mounted to one end of a flowline jumper 23. A guide or mandrel 25 extends from flowline coupling 21 for reception within a socket 27. Mandrel 25 positions flowline coupling 21 in alignment with tree coupling 19 when jumper 23 is lowered into the sea from the surface. As shown in FIG. 3, a hinge mechanism 26 connects flowline coupling 21 and mandrel 25 to flowline jumper 23. Hinge mechanism 26 allows flowline jumper 23 to move to a position parallel to mandrel 25, as illustrated by the dotted lines in FIG. 5. In the connected position, coupling 21 is 90° relative to mandrel 25. Hinge mechanism 26 may be of a variety of type, and in this embodiment, hinge 26 is a clevis and a pair of pinions 28 that rotate within holes in the clevis.

Socket 27 is located on the end of an arm 29 that extends horizontally outward from a ring 31. Ring 31 has a downward facing funnel 32 to facilitate sliding ring 31 over outer wellhead housing 13 in this embodiment. Ring 31 is selectively rotatable relative to wellhead housing 13 as illustrated by the dotted lines of FIG. 2. Lock members 33, such as pins or screws (FIG. 1) will selectively lock ring 31 in a desired orientation. Lock members 33 are accessible by an ROV to tighten and loosen. Lock members 31 engage a mating slot in wellhead housing 13. Ring 31 and arm 29 are preferably installed on wellhead housing 13 before wellhead housing 13 is lowered into the sea. Subsequently, an ROV may be employed to rotate ring 31 to point arm 29 in a desired direction. An orientation sleeve that is part of a tubing hanger (not shown) is oriented with arm 29 when it is lowered into the high pressure wellhead housing. Any change in direction of arm 29 is performed before the tubing hanger is installed. Tree 15 engages the orientation sleeve (not shown) located within the inner wellhead housing above the tubing hanger as tree 15 is landing in the wellhead housing to orient flow outlet 19 in alignment with arm 29.

Referring again to FIG. 4, flowline jumper 23 may be a single integral conduit or a number of sections secured together, such as by threads, flanged ends, or welding. Flowline jumper 23 may be of carbon steel along with a number of other alloys such as titanium and chrome. Flowline jumper 23 may also be formed at least partially of composite materials of fiber in a resin. Furthermore, flowline jumper 23 could be formed of flexible pipes that are made of multiple articulated components that flex relative to each other. Flowline jumper 23 may have a single passage through it or multiple passages.

Figure 4:
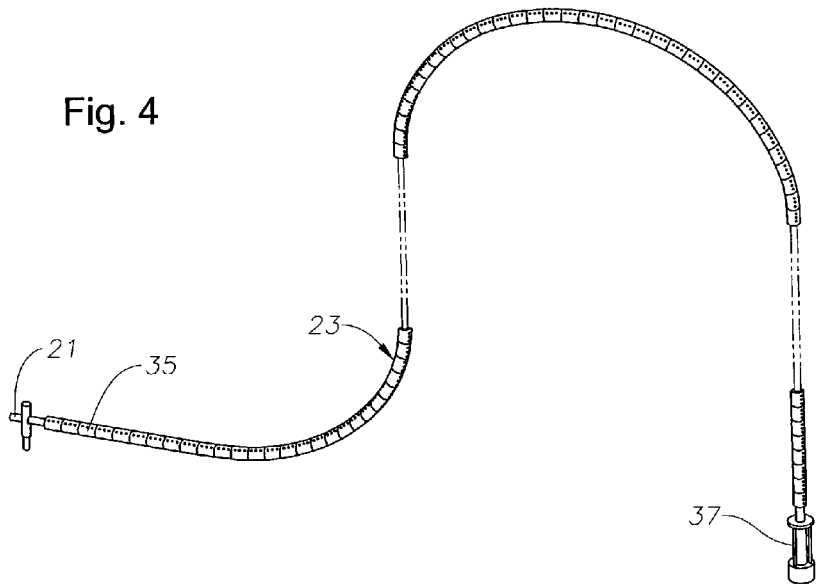
FIG. 4 is a perspective view of the flowline jumper of FIG. 3.

Flowline jumper 23 also has at least a portion that is buoyant. In this embodiment, a plurality of short buoyant segments 35 are secured over flowline jumper 23, forming a buoyant jacket. As shown in FIG. 4, segments 35 need not extend the full length of flowline jumper 23. However, in the first embodiment, they should extend sufficiently to cause flowline jumper 23 to be arcuate within its central section. In this embodiment, the length of flowline jumper 23 relative to its diameter will cause a portion to flex into an arcuate shape due to buoyancy even if the conduit of flowline jumper 23 is of steel. The flexibility of flowline jumper 23 is preferably sufficient to avoid any permanent deformation due to the buoyancy of buoyant members 35. The buoyancy should be adequate to provide buoyancy to a portion of jumper 23 whether filled with water, hydrocarbon liquid or gas. Segments 35 may serve as bend restrictors to prevent excessive bending of the conduit of flowline jumper 23.

FIG. 4 shows a vertical connector 37 on the end opposite connector 21. Connectors 21 and 37 are preferably negatively buoyant for ease in installation. Connector 37, like connector 21, may be of a variety of types. When flowline jumper 23 is installed, a leg portion extending from connector 21 will be horizontal and a leg portion extending from vertical connector 37 will be vertical. Buoyant members 35 cause the portion adjacent vertical connector 37 to extend upward and curve over in an arcuate shape within a vertical plane. The curved portion has an apogee 38 that is elevated more than the remaining portions of flowline jumper 23, apogee 38 being equidistant between the horizontal and vertical leg portions. The combination of the horizontal portion and arcuate portion over the length of jumper 23 may be termed a lazy wave.

Figure 5:
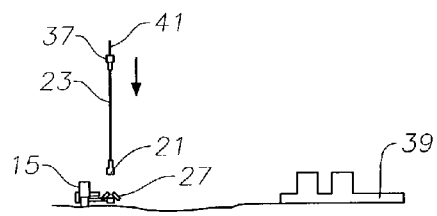
FIG. 5 is a schematic view of the flowline jumper of FIG. 3, shown being lowered into the sea.

FIG. 5 illustrates one method for connecting tree 15 to a second component, which in this case is a subsea manifold 39. The second component 39 could also be another flowline, or a daisy chain to another well. Manifold 39 receives flow from a number of subsea wells and routes that flow to further processing equipment. The second component 39 could include equipment normally mounted to tree 15, such as a choke, production/injection flow isolation valve, multiphase flow meters, and erosion, corrosion and pressure and temperature monitoring sensors.

The length of jumper 23 is greater than the horizontal distance between tree 15 and manifold 39. The additional length is sufficient to create the lazy wave configuration shown in FIGS. 4 and 9–12, however the precise configuration and the additional length of jumper 23 over the actual horizontal distance is not critical. The distances between tree 15 and manifold 39 may vary and could be as short as 30 meters and as long as several kilometers.

As shown in FIG. 5, a lift line 41 is secured to one of the ends of flowline jumper 23. In this embodiment, it is shown secured to second connector 37. First connector 21 is weighted such that its negative buoyancy causes it to assume a lower elevation than any other portion of jumper 23 as it is being lowered. Also, the negative buoyancy has caused mandrel 25 to hinge over to an orientation parallel with flowline jumper 23. Flowline jumper 23 is essentially linear, straight and vertical in the positions of FIGS. 5–8.

Figure 6:
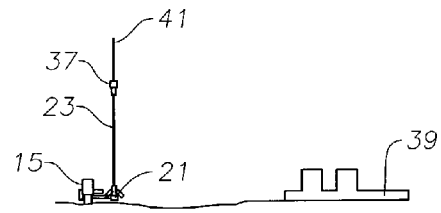
FIG. 6 is a schematic view of the flowline jumper of FIG. 3, shown being stabbed into the tree.
Figure 7:
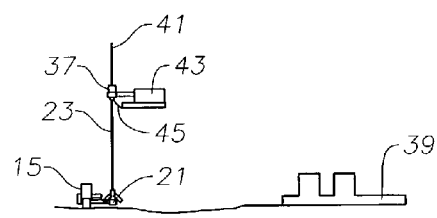
FIG. 7 is a schematic view of the flowline jumper of FIG. 3, showing a remote operated vehicle in the process of connecting to the flowline jumper.
Figure 8:
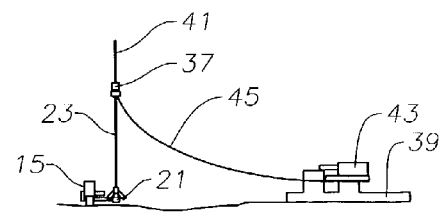
FIG. 8 is a schematic view of the flowline jumper of FIG. 3, showing the ROV landed on a subsea manifold and connected by a pull line to the flowline jumper.
Figure 9:
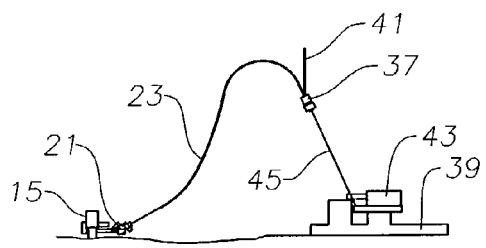
FIG. 9 is a schematic view of the flowline jumper of FIG. 3, showing the pull line being retracted by the ROV, drawing the second connector of the flowline jumper into alignment with the manifold.
Figure 10:
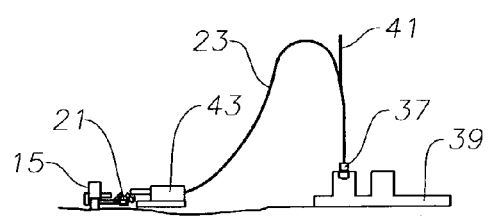
FIG. 10 is a schematic view of the flowline jumper of FIG. 3, showing the second connector of the flowline jumper being connected to the subsea manifold.
Figure 11:
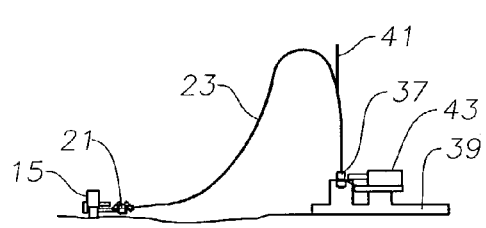
FIG. 11 is a schematic view of the flowline jumper of FIG. 3, showing the remote operated vehicle connecting the couplings of the flowline jumper and the tree to each other.

In FIG. 6, mandrel 25 (FIG. 1) is shown stabbing into socket 27 while lift line 41 is still attached. Remote cameras may be used for guiding mandrel 25 into socket 27. Referring to FIG. 7, while flowline jumper 23 is still vertical, an ROV 43 is shown attaching a pull line 45 to vertical connector 37. As shown in FIG. 8, ROV 43 reels out pull line 45 and lands on manifold 39. Lift line 41 still maintains flowline jumper 23 in the vertical orientation in FIG. 8. Then, as shown in FIG. 9, ROV 43 reels in pull line 45, causing second connector 37 to approach manifold 39. Hinge mechanism 26 (FIG. 1) allows first connector 21 and a portion of flowline jumper 23 to move to a horizontal position. FIG. 10 shows ROV 43 connecting second connector 37 to a suitable mandrel on manifold 39. Subsequently, as shown in FIG. 11, ROV 43 moves over into engagement with first connector 21. ROV 43 performs the actuation to cause first connector 21 to sealingly engage and secure to tree coupling 19 (FIG. 1).

Figure 12:
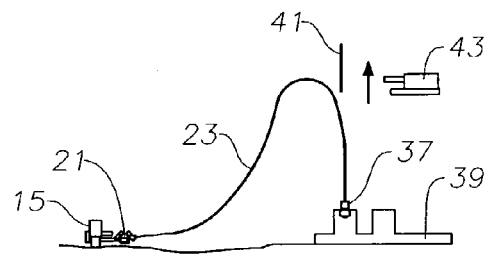
FIG. 12 is a schematic view of the flowline jumper of FIG. 3 showing the installation complete and the ROV being retrieved.

FIG. 12 illustrates flowline jumper 23 in the desired position, with lift line 41 removed and being retrieved as well as ROV 43. Buoyant members 35 cause a portion of flowline jumper 23 to assume an arcuate configuration while another portion is horizontal.

Figure 13:
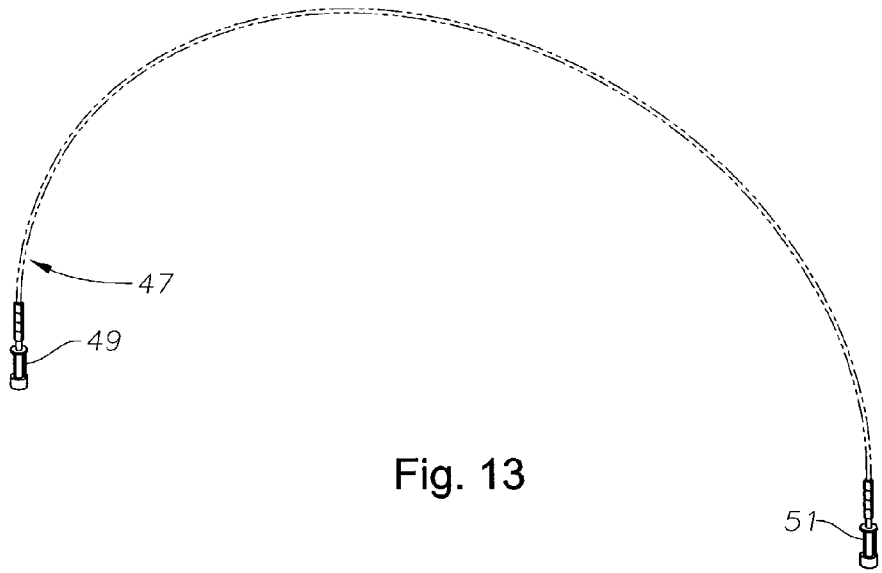
FIG. 13 is a perspective view of a second embodiment of a flowline jumper.

In the embodiment of FIG. 13, flowline jumper 47 may be constructed in the same manner as flowline jumper 23. It may contain a buoyant jacket (not shown) over all of its length or a portion. Both connectors 49, 51 are vertical types such as connector 37 (FIG. 4). Consequently, the buoyancy of flowline jumper 47 causes it to assume a single arcuate configuration.

Figure 14:
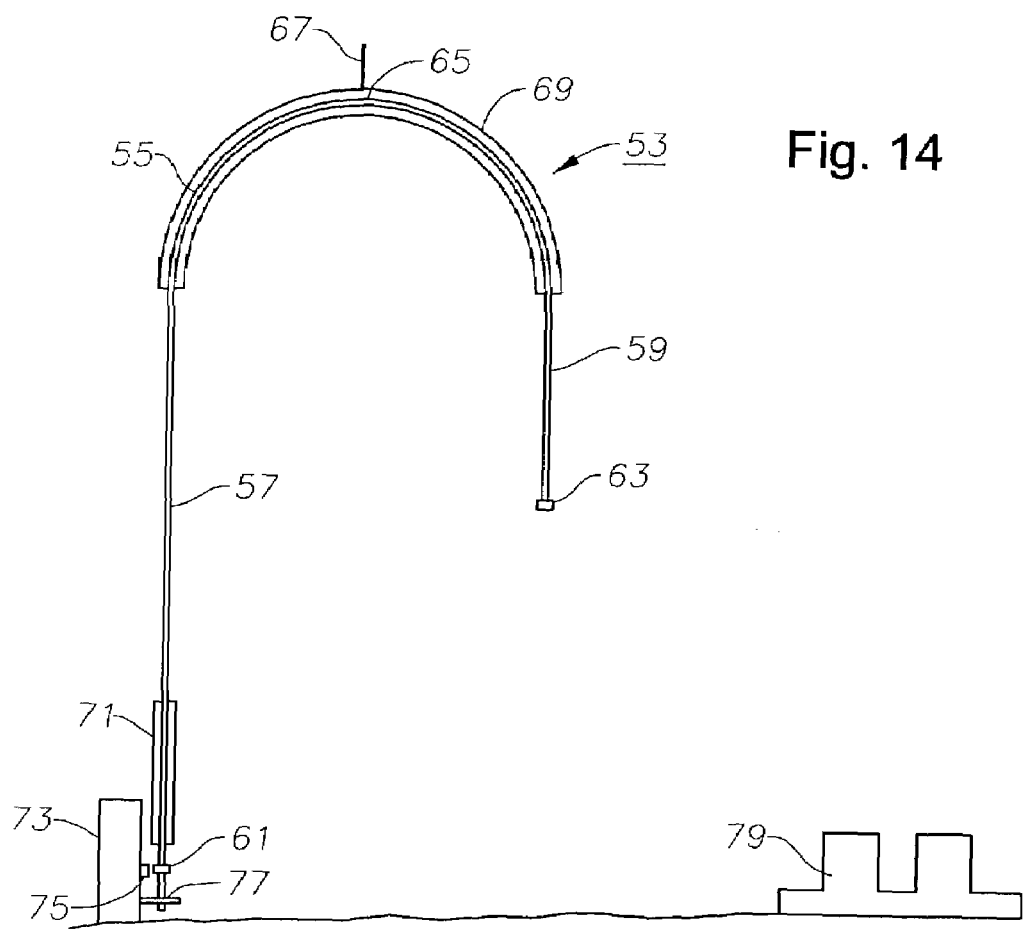
FIG. 14 is a schematic side view of a third embodiment of a flowline jumper being lowered into the sea.
Figure 15:
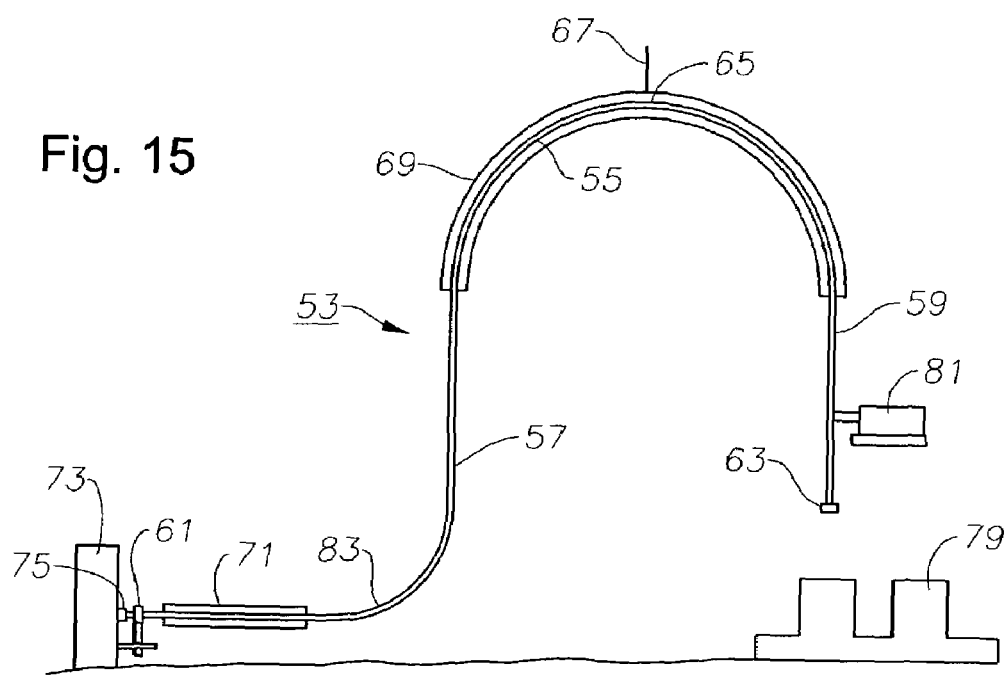
FIG. 15 is a schematic side view of the flowline jumper of FIG. 14, shown after the first leg is bent horizontally and the second leg is approaching the manifold.
Figure 16:
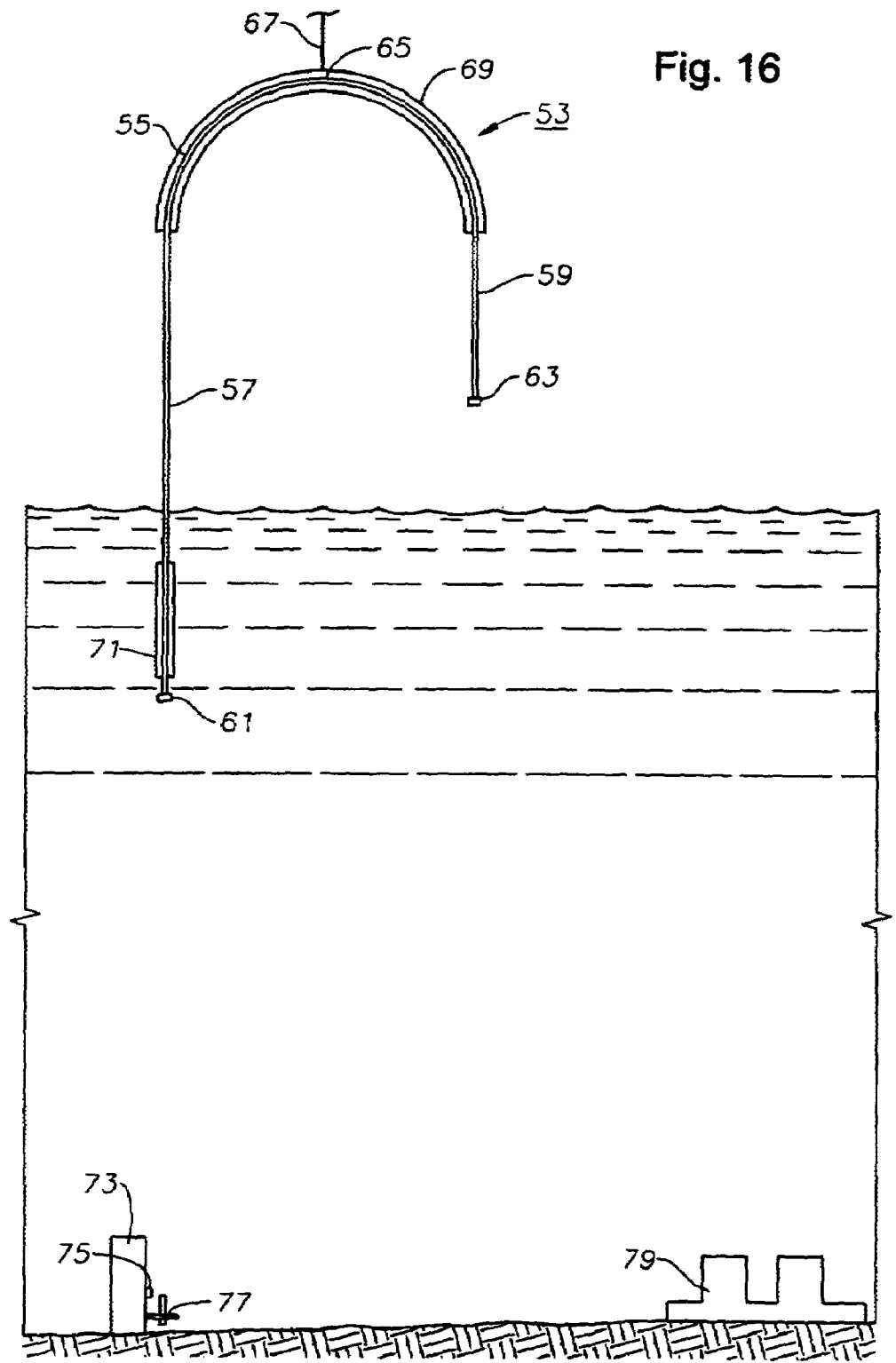
FIG. 16 is a schematic side view of the flowline jumper of FIG. 14, shown prior to entering the sea.

Referring to FIGS. 14–16, in this embodiment, flowline jumper 53 is pre-bent at the surface prior to lowering it into the sea. As best illustrated in FIGS. 14 and 16 an arcuate or curved portion 55 is formed by the bending, this curved portion 55 being permanently formed so that once formed it is rigid. A first leg 57 extends from one side of curved portion 55. A second and shorter leg 59 extends from the other side of side of portion 55. First leg 57 has a first end 61 with a coupling, and second leg 59 has a second end 63 with a coupling. Legs 57, 59 are preferably parallel to each other initially and vertical while lowering into the sea as shown in FIG. 14.

Curved portion 55 is preferably semi-circular, resulting in an apogee 65 midway between legs 55, 57. Preferably a single point lift line 67 is attached to apogee 65 to lower flowline juniper 53 into the sea. Apogee 65 will be elevated more than the remaining portions of flowline jumper 53 as it is lowered.

Buoyant elements 69 are located on curved portion 55. Elements 69 may be a single member bent into a curved shape, or they may comprises a coating. Preferably a bend restrictor 71 is located near first end 61 to prevent first leg 57 from bending in this area. Bend restrictor 71 also includes weights to assure that first end 61 is at a lower depth than second end 63 while flowline jumper 53 is being lowered into the sea. As best illustrated in FIGS. 14 and 16, second end 63 is also preferably weighted sufficiently so that legs 57, 59 remain vertical while flowline jumper 53 is being deployed.

FIG. 14 shows first end 61 engaging a first subsea component, which in the example comprises a production tree 73. Tree 73 has a horizontal coupling 75 and a vertical socket 77, which may be of the type shown in FIGS. 1 and 3. In FIG. 14, second end 63 is shown spaced laterally and above the second subsea component, which may be a manifold 79. An ROV 81 (FIG. 15) may be employed to assist first end 61 in engaging socket 77. After first end 61 stabs into socket 77, the operator continues to lower lift line 67. First end 61 hinges over to a horizontal position in alignment with horizontal coupling 75 on subsea tree 73.

ROV 81 assists in connecting first end 61 to coupling 75.

Continued lowering of lift line 67 causes a bend 83 to occur in first leg 57 at its junction with curved portion 55. Bend 83 is in an opposite direction to curved portion 55. First leg 57 assumes a horizontal orientation due to the weight of flowline 53 as it is being lowered. ROV 81 pulls second end 63 over into alignment with manifold 79, and the operator continues lowering until second end 63 stabs vertically into a coupling on manifold 79. Second leg 57 remains vertical after installation due to buoyant elements 69 keeping apogee 65 at the highest elevation of any portion of flowline jumper 53. Also, a single vertical plane will pass through legs 57, 59 and curved portion 55 once flowline jumper 53 has been installed.

The invention has significant advantages. The curved buoyant portion of the jumper reduces the need for critical pre-measurements and fabrication. The jumper may be readily installed by using a lift line with the assistance of an ROV. The rotatable ring and support arm mounted to the wellhead housing enables the orientation of the tree outlet to be changed after the wellhead housing has been installed in the sea floor.

While the invention has been shown in only a few of its forms, it should be apparent to those skilled in the art that it is not so limited but susceptible to various changes without departing from the scope of the invention. For example, the bend between the first leg and the curved portion of the embodiment of FIGS. 14 and 15 could be pre-formed at the surface, if desired.

We claim:

1. In a subsea well system having first and second components spaced laterally apart from each other a selected distance along a sea floor, the improvement comprising:
   a flowline that is pre-bent prior to installation to form a permanently curved portion with a substantially rigid apogee;
   first and second connectors on opposite ends of the flowline that are connected to the first and second components respectively, the first and second connectors extend vertically into engagement with the components, and the apogee is located midway between the first and second connectors; and
   at least part of the curved portion of the flowline being permanently buoyant to cause the apogee to be at a higher elevation than the first and second connectors subsequent to installation.

2. In a subsea well system having first and second components spaced laterally apart from each other a selected distance along a sea floor, the improvement comprising:
   a flowline that is pre-bent prior to installation to form a permanently curved portion with a substantially rigid apogee;
   first and second connectors on opposite ends of the flowline that are connected to the first and second components respectively, the first component has a vertically oriented socket and a horizontally oriented coupling, and the first connector comprises:
      a horizontally oriented coupling that sealingly couples to the coupling of the first component; and
      a vertically oriented mandrel that inserts into the socket to guide the coupling of the flowline into alignment with the coupling of the first component; and
   at least part of the curved portion of the flowline being permanently buoyant to cause the apogee to be at a higher elevation than the first and second connectors subsequent to installation.

3. The system according to claim 2, wherein the first component has a vertically oriented socket and a horizontally oriented coupling, and the first connector further comprises:
- a hinge mechanism between the mandrel and the flowline that enables the coupling of the flowline to move between a parallel position with the mandrel and a perpendicular position to the mandrel.

4. In a subsea well system having first and second components spaced laterally apart from each other a selected distance along a sea floor, the improvement comprising:
- a flowline that is pre-bent prior to installation to form a permanently curved portion with a substantially rigid apogee;
- first and second connectors on opposite ends of the flowline that are connected to the first and second components, respectively, the first component comprises: a vertical tubular member; a ring mounted around the member; an arm extending laterally from the ring; a tube leading from the tubular member to the arm, the tube having a coupling on an end; and wherein the ring is selectively rotatable relative to the tubular member to position the coupling in a desired direction for connection with the flowline;
- at least part of the curved portion of the flowline being permanently buoyant to cause the apogee to be at a higher elevation than the first and second connectors subsequent to installation.

5. The system according to claim 4, wherein the first component comprises:
- a vertical socket located on an end of the arm; and
- wherein the ring is selectively rotatable relative to the tubular member to position the coupling in a desired direction for connection with the flowline; and the first connector comprises:
- a horizontally oriented coupling that sealingly couples to the coupling of the first component; and
- a vertically oriented mandrel that inserts into the socket to guide the coupling of the flowline into alignment with the coupling of the first component.

6. In a subsea well system having a subsea production tree having a flowline coupling spaced laterally from a flowline coupling of a processing component located on a sea floor, the improvement comprising:
- a flowline that is pre-bent prior to installation to form a permanently curved portion with an apogee;
- connectors on opposite ends of the flowline connected to the couplings for flowing fluids between the tree and the component;
- a buoyant jacket located on at least the curved portion of the flowline that stays on at least the curved portion of the flowline during operations after installation is complete, causing the curved portion to maintain an upright configuration, with the apogee located at a higher elevation than remaining portions of the flowline;
- a vertical tubular member on which the tree is mounted;
- a ring mounted around the tubular member;
- an arm extending laterally from the ring;
- a tube leading from the tree to the arm, the coupling of the tree being located on an end of the tube; and
- wherein the ring is selectively rotatable relative to the tubular member to position the coupling of the tree in a desired direction for connection with the flowline.

7. The system according to claim 6, wherein one of the connectors extends horizontally into engagement with one of the couplings.

8. The system according to claim 6, wherein one of the connectors extends vertically into engagement with one of the couplings.

9. The system according to claim 6, wherein one of the connectors extends horizontally into engagement with one of the couplings, and the other of the connectors extends vertically into engagement with the other of the couplings.

10. The system according to claim 6, wherein both of the connectors extend vertically into engagement with the couplings.

11. The system according to claim 6, further comprising:
- a vertical socket located on an end of the arm; and
- wherein the ring is selectively rotatable relative to the tubular member to position the coupling of the tree in a desired direction for connection with the flowline; and one of the connectors comprises:
- a horizontally oriented coupling that sealingly couples to the coupling of the tree; and
- a vertically oriented mandrel that inserts into the socket to guide the coupling of the flowline into alignment with the coupling of the tree.

12. The system according to claim 6, wherein the curved portion of the flowline is flexible, and wherein the buoyant jacket flexes the flowline to create the curved portion of the flowline.

13. The system according to claim 6, wherein the curved portion of the flowline is rigid.

14. A method of transmitting fluids between subsea first and second components that area separated laterally from each other on a sea floor, comprising:
- forming a curved portion in a flowline prior to lowering the flowline into the sea; and then
- lowering the flowline into the sea and connecting first and second ends of the flowline to the first and second components, respectively, the curved portion having buoyancy sufficient to position an apogee of the curved portion at an elevation higher than the ends of the flowline.

15. The method according to claim 14, wherein one of the ends of the flowline extends horizontally into engagement with one of the components.

16. The method according to claim 14, wherein the step of connecting the ends comprises stabbing at least one of the ends vertically into engagement with one of the components.

17. The method according to claim 14, wherein one of the ends of the flowline extends horizontally into engagement with one of the components and the other of the ends extends vertically into engagement with the other of the components.

18. The method according to claim 14, wherein the step of connecting the ends comprises stabbing both of the ends vertically into engagement with the component.

19. The method according to claim 14, wherein the flowline is lowered on a lift line connected at a single point.

20. A method of transmitting fluids between subsea first and second components that area separated laterally from each other on a sea floor, comprising:
- lowering a flowline into the sea and connecting first and second ends of the flowline to the first and second components, respectively, the flowline having a curved portion with buoyancy sufficient to position an apogee of the curved portion at an elevation higher than the ends of the flowline;

bending the flowline to form the curved portion prior to lowering the flowline into the sea, the curved portion defining parallel first and second legs that terminate in the first and second ends, respectively; and the step of lowering the flowline into the sea comprises attaching a lift line to the curved portion and lowering the flowline with the legs extending downward from the curved portion; and the step of connecting the ends to the components comprises stabbing the first end vertically into the first component, then lowering the flowline further, hinging the first end over horizontally and stabbing the second end vertically into the second component, causing the first leg to bend into a horizontal configuration and the second leg to remain horizontal.

* * * * *

UNITED STATES PATENT AND TRADEMARK OFFICE
CERTIFICATE OF CORRECTION

PATENT NO. : 7,044,228 B2 Page 1 of 1
APPLICATION NO. : 10/358731
DATED : May 16, 2006
INVENTOR(S) : Gawain Langford et al.

It is certified that error appears in the above-identified patent and that said Letters Patent is hereby corrected as shown below:

In the Claims:

Column 8, line 33, delete "area" and insert --are-- before "separated"
Column 8, line 62, delete "area" and insert --are -- before "separated"

Signed and Sealed this

Fifth Day of December, 2006

JON W. DUDAS
*Director of the United States Patent and Trademark Office*